United States Patent
Odier

[11] 3,883,610
[45] May 13, 1975

[54] CROSSLINKED POLYBENZOXAZOLE COPOLYMER AND A PROCESS FOR PREPARING THE SAME

[75] Inventor: Jean Odier, Antony, France

[73] Assignee: Societe Anonyme Francaise du Ferodo, Paris, France

[22] Filed: Aug. 14, 1973

[21] Appl. No.: 388,151

[52] U.S. Cl. ............... 260/841; 260/823; 260/824; 260/830 P; 260/838; 260/849; 260/857 R; 260/857 PA; 260/857 PE; 260/857 UN; 260/858
[51] Int. Cl. ..................... C08g 37/16; C08g 41/04
[58] Field of Search ........................... 260/838, 841

[56] References Cited
UNITED STATES PATENTS

3,316,213   4/1967   Berr ...................................... 260/47

FOREIGN PATENTS OR APPLICATIONS

| 42-19272 | 9/1967  | Japan |
| 46-07702 | 3/1971  | Japan |
| 46-24250 | 7/1971  | Japan |
| 46-34989 | 10/1971 | Japan |

OTHER PUBLICATIONS

V. M. Korshak et al., Vysokomolekal Soedin, 8/9 1599–603 (1966) (Russ).

*Primary Examiner*—Paul Lieberman
*Attorney, Agent, or Firm*—Young & Thompson

[57] ABSTRACT

Crosslinked polybenzoxazole copolymer of the general formula:

R 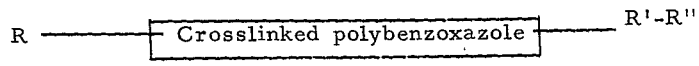 R'-R'' in which the radicals R, R' and R'' have the following meaning:
R = —H or R';
R' = —O—, —OCH$_2$—, —NH— or —CH$_2$CHOH—;
and
R'' is a polymeric radical corresponding to at least one resin chosen from the group comprising phenoplasts, aminoplasts, epoxy resins, oily polymers of phosphonitrile chkoride, alkyd resins, polyurethanes, polyimides, polyimide-amides, poly-bis-maleimides and silicones.

This copolymer is prepared by polycondensation of a linear or crosslinked polyamide with one or more polymers corresponding to the group R'' in the presence of a cross linking agent in the case of a linear polyamide.

7 Claims, No Drawings

CROSSLINKED POLYBENZOXAZOLE COPOLYMER AND A PROCESS FOR PREPARING THE SAME

The invention relates to copolymers of crosslinked polybenzoxazoles, by way of new industrial products; it also relates to the processes for their preparation as well as to their applications, especially as electrical insulators, moulding powders, binders and adhesives.

It is well known that crosslinked polybenzoxazoles are valuable polymers because they are resistant to high temperatures and to solvents; they lead to shaped objects and to coatings which can be used for any high temperature applications, and more particularly as electrical insulators as well as binders and adhesives in composite objects of all types.

Processes for the preparation of the above polymers are already known, by polycondensation of a diamine and a diacid and triacid compound, in the melt, or in solution, or interfacially, the polycondensation being followed by a heat treatment.

At the intermediate polyamide stage, the above polymers, produced in accordance with known methods, possess, in larger or smaller number depending on the degree of polycondensation, free groups terminating either in an amine function or in an acid function or in a function derived from an acid. These free groups are not chemically inert and it is of value to react these free groups with prepolymers or polymers possessing active groups which are compatible with them in order to produce copolymers which possess totally unexpected properties of mouldability and stability to heat.

Thus, according to an essential characteristic of the invention, copolymers of crosslinked polybenzoxazoles have been produced which correspond to the general formula:

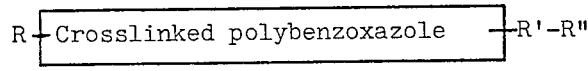

in which the radicals R, R' and R'' have the following meaning:

R = —H or R';
R' = —O—, —OCH$_2$—, —NH— or —CH$_2$CHOH—; and
R'' is a polymeric radical corresponding to at least one resin chosen from amongst the group comprising phenoplasts, aminoplasts, epoxy resins, oily polymers of phosphonitrile chloride, alkyd resins, polyurethanes, polyimides, polyimide-amides, poly-bis-maleimides and silicones.

These copolymers possess the advantage of a relatively low cost price and this applies especially in the case of phenoplasts, aminoplasts and epoxy and alkyd resins, this low cost price being associated in certain cases with an improvement in specific properties, in particular and for example in the field of adhesives, and this applies in the case of epoxy resins and phenoplasts.

According to another characteristic of the invention, the preparation process employs, as the starting product, either a linear polyamide or a polyamide which is already crosslinked. In the first case, the linear polyamide in powder form is mixed with a crosslinking agent derived from an aromatic triacid and at least one of the compounds chosen from amongst the group comprising phenoplasts, aminoplasts, epoxy resins, oily polymers of phosphonitile chloride, alkyd resins, polyurethanes, polyimides, polyimide-amides, poly-bis-maleimides and silicones, and the said mixture is moulded at a temperature of between 200°C and 250°C and under a pressure of between $5 \times 10^7$ and $10^8$ Pa ( ) for 3 to 10 minutes, and then stoved again at a temperature of between 380°C and 400°C, reached by raising the temperature gradually, for 4 to 6 hours. In the second case, that is to say when a polyamide which is already crosslinked is used as the starting product, the procedure is the same as in the first case but without the crosslinking agent.

Another advantage of these copolymers of crosslinked polybenzoxazoles resides mainly in the facility with which they can be employed, which makes it possible to extend the field of possible applications, the properties of the crosslinked polybenzoxazoles being retained, namely stability to heat, infusibility, insolubility and the like.

In effect, according to the process which is the subject of the invention, if polyamides are used which possess only high softening points, benefit is derived from the properties of flow and plasticisation provided by the additional polymer. In the case of polyamides of low molecular weight, which possess relatively low softening points, the additional polymer plays the role of a "curing agent", with a rapid action, which makes it possible, in a relatively short time compatible with a production lien, to "stove" the binder, making it possible to handle the object.

The characteristics and advantages of the invention will become apparent, furthermore, from the description and from the examples of the way in which it is carried out, which follow.

The crosslinked polybenzoxazole copolymer can be produced by simply mixing the polyamide and the additional polymer, either in a solid medium or in a liquid medium, in accordance with the processes usually employed. However, it is also possible to produce it from reaction products which liberate constituents which are capable of reacting with one another to form the polyamide and/or the additional polymer.

The phenoplasts, which comprise novolacs and resols, react due to the primary alcohol group (resols) or to the OH group (novolacs). The aminoplasts and polyurethanes are advantageously used in their precondensation state in order to facilitate the reaction of their amine groups. The epoxy resins act on the free groups be they amides or acids, and the polyamides react due to their free acid groups or to their free groups which are derived from acids.

Depending on the compounds used as well as on the desired applications, the values of the concentration of the additional polymer can extend over quite a wide range, generally between 5 and 80% and preferably between 30% and 65% by weight.

The copolymer character can be verified by infrared spectrography, which demonstrates the appearance or intensification of bands peculiar to the new chemical bonds thus formed and by the improvement in the heat properties which are better than those which could be expected from the law of mixtures, as thermogravimetric analysis can show.

The examples below state the conditions for carrying out the processes for the preparation of the copolymers according to the invention and demonstrate their specific properties.

EXAMPLE I

A linear polyamide in the form of a powder, produced by condensing equimolecular amounts of 3,3'-dihydroxybenzidine and isophthalic acid chloride, in solution in dimethylacetamide, is used as the starting polyamide.

This polyamide has a softening point of about 200°C. The crosslinking agent is a napththol ester of trimesic acid and the additional polymer is a phenol/formaldehyde resin with alumina.

These compounds are mixed intimately in the following proportions:

| | |
|---|---|
| Linear polyamide | 7 g |
| Naphthol ester of trimesic acid | 1 g |
| Phenol/formaldehyde resin | 12 g |
| Alumina | 50 g |

This mixture is heated to 210°C in a mould in which it is compressed for 3 minutes under a pressure of $7.5 \times 10^7$ Pa, gas being released several times during this treatment.

After 3 minutes, the mixture is released from the mould and is then subjected to the usual cycle of additional stovings up to 350°C–400°C.

Such a composition has a residue of 93% under nitrogen at 400°C and a residue of 87% at 800°C instead of 91% and 86% respectively for an equivalent sample without the phenoplast.

Thus, the heat properties are not only practically retained with respect to the crosslinked polybenzoxazoles, but are improved further relative to those predicted by the law of mixtures which leads to 80% and 66%, all other conditions being equal.

Mouldability tests have shown that, for an equivalent sample without the phenoplast, the moulding would require a pressure of about $1.2 \times 10^8$ Pa.

EXAMPLE II

The procedure of Example I is followed, using, for the mixture, a crosslinked polyamide instead of a linear polyamide, an aminoplast instead of the phenoplast and barium sulphate instead of alumina.

The crosslinked polyamide is produed by interfacial condenstion of 0.1 mol of dihydroxybenzidine hydrochloride, 0.09 mol of isophthalic acid dichloride and 0.0067 mol of trimesic acid trichloride in 100 cc. of cyclohexanol, and a solution of 0.22 mol of sodium carbonate is introduced, whilst stirring vigorously, at 5°C.

The advantages listed in Example I are to be found again in this variant of carrying out the process.

EXAMPLE III

The starting material is a linear polyamide produced by mixing intimately 0.1 mol of 3,3'-dihydroxybenzidine with 0.09 mol of the phenol diester of isophthalic acid and heating at 200°C for 1 hour.

The following compounds are mixed intimately in the proportions indicated:

| | |
|---|---|
| Linear polyamide | 7 g |
| Phenol ester of trimesic acid | 1 g |
| Epoxy resin prepolymer | 2 g | in the form of a 35% strength solution in dimethylacetamide.

This solution can be used to join stainless steels: after degreasing and treating (the steels) with an 8:1:1 mixture of hydrochloric, phosphoric and nitric acids, a film is deposited on each surface. The solvent is removed in a vacuum oven at 80°C. The two metal parts are then brought into contact in a mounting and are pressed at 200°C for 30 minutes, exerting a pressure of about $0.15 \times 10^7$ Pa.

A measurement of the shear strength (ASTM Standard Specification 1002) made at ambient temperature on the composite sample thus produced gives a value of 1.2 kg/mm² whilst for an equivalent sample without the epoxy resin the shear strength is only 0.3 kg/mm².

EXAMPLE IV

The procedure described in Example III is followed, except that the mixture indicated is dissolved in N-methylpyrrolidone.

EXAMPLE V

The starting material is a linear polyamide produced by interfacial condensation of 0.1 mol of 3,3'-dihydroxybenzidine and 0.1 mol of isophthalic acid chloride.

The following mixture is produced:

| | |
|---|---|
| Linear polyamide | 7 g |
| Phenol ester of trimesic acid | 1 g |
| Polymer mixture defined by the name oily polymer of phosphonitrile chloride | 3 g | as a 28% strength solution in N-methylpyrrolidone.

This solution is deposited in small portions in a parallelepiped mould containing 50 g of glass wool, the solvent is evaporated in a vacuum oven at 80°C and the residue is compressed under $5 \times 10^6$ Pa at 220°C for 15 minutes.

The mouldability of the product obtained has been improved by the presence of the oily polymer.

Of course, the present invention is in no way limited to the preparation methods described above, but encompasses any variant for carrying it out.

What I claim is:

1. Crosslinked polybenzoxazole copolymer of the formula

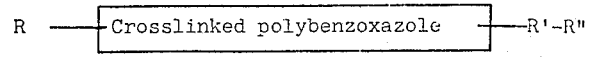

in which R is a member selected from the group consisting of hydrogen and R';

R' is a member selected from the group consisting of O, OCH₂, NH and CH₂CHOH; and R'' is phenoplast in an amount between 5 and 80% by weight of the whole.

2. A copolymer as claimed in claim 1, in which said amount is 30 to 65% by weight of the whole.

3. A copolymer as claimed in claim 1, in which said phenoplast is phenol/formaldehyde resin.

4. A process for the preparation of a copolymer of the formula

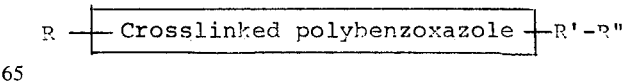

in which R is a member selected from the group consisting of hydrogen and R';

R' is a member selected from the group consisting of O, OCH$_2$, NH and CH$_2$CHOH; and R" is phenoplast in an amount between 5 and 80% by weight of the whole, comprising the steps of mixing a linear polyamide in powder form with a crosslinking agent derived from an aromatic triacid and phenoplast in an amount between 5 and 80% by weight of the whole; and molding the resultant mixture at a temperature between 200°C. and 250°C.

5. A process as claimed in claim 4, in which said amount is between 30 and 65% by weight of the whole.

6. A process as claimed in claim 4, in which said phenoplast is phenol/formaldehyde resin.

7. A process as claimed in claim 6, in which said crosslinking agent is naphthol ester of trimesic acid, and in which alumina is present in the mixture.

* * * * *